May 1, 1923.
C. E. BIRD
TRACTOR
Filed May 22, 1920
1,453,265
2 Sheets-Sheet 1
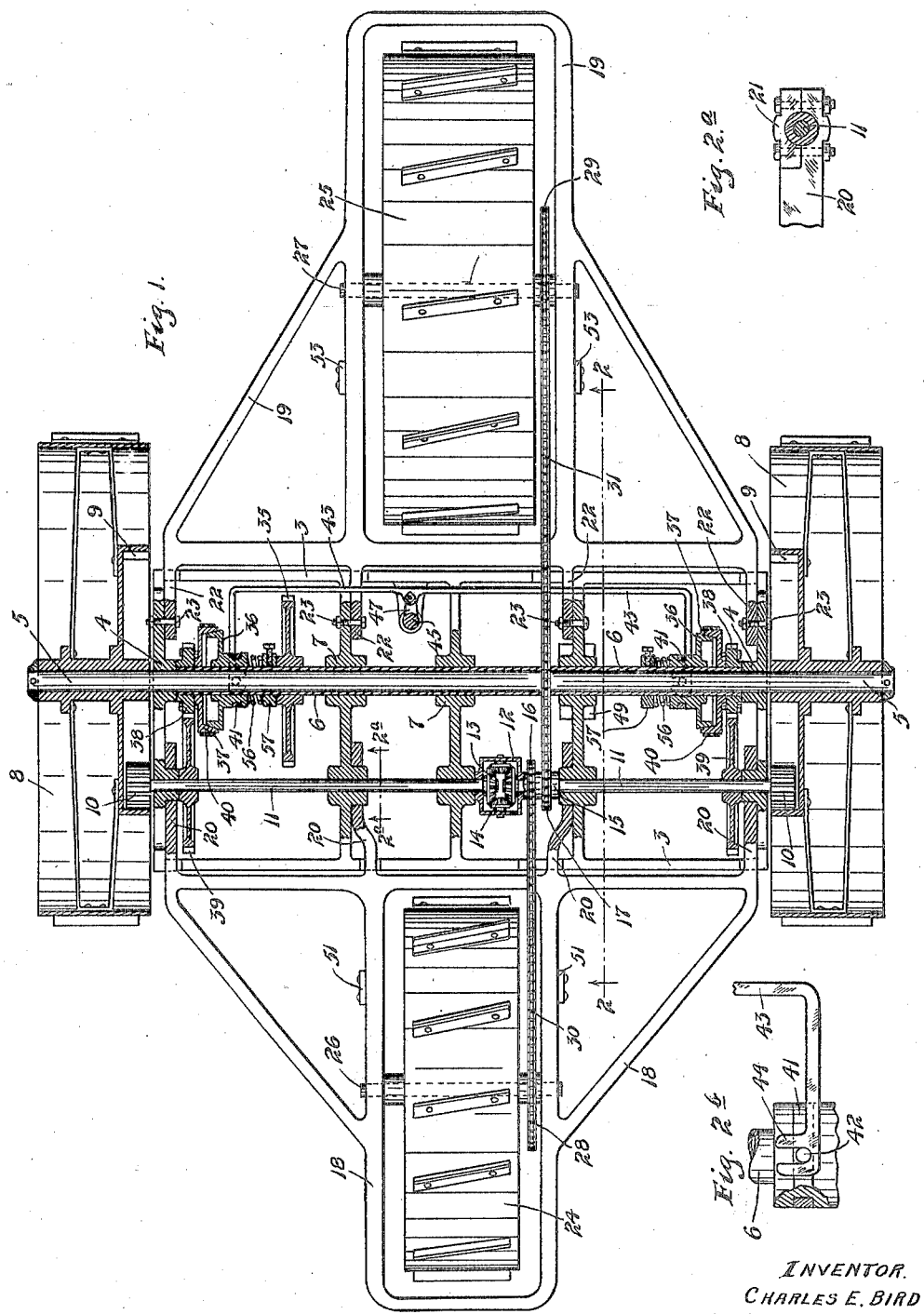
INVENTOR.
CHARLES E. BIRD
BY HIS ATTORNEYS.

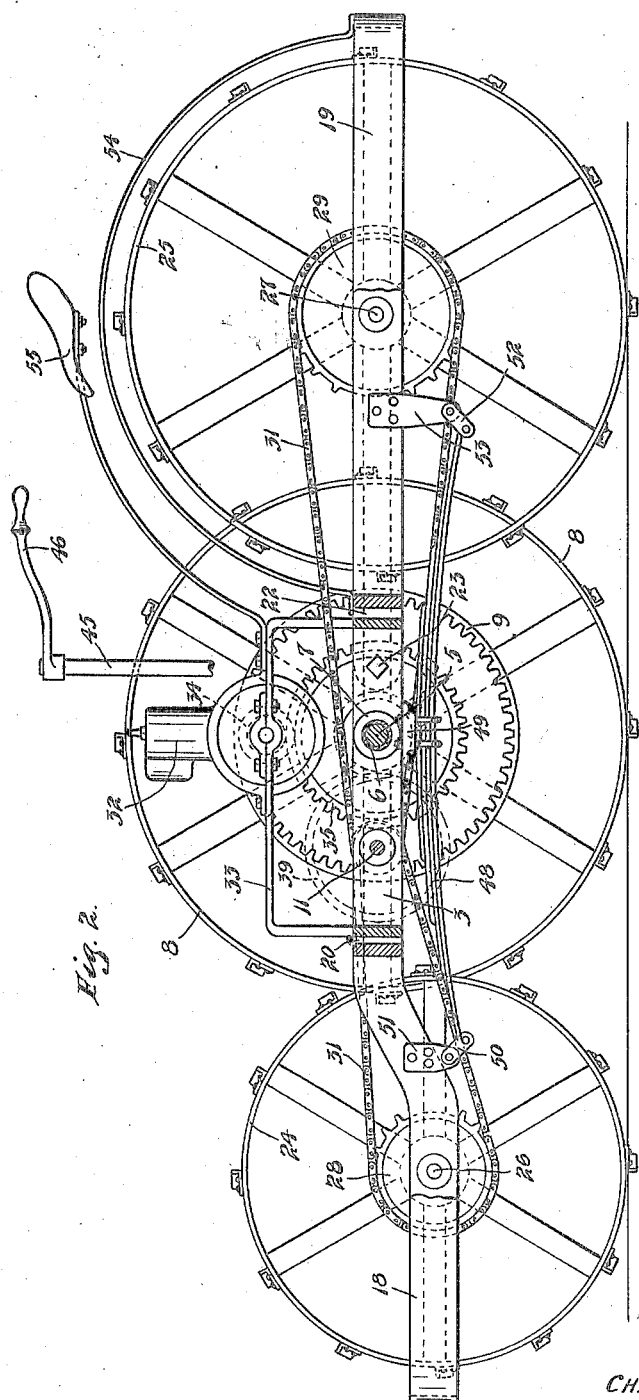

Patented May 1, 1923.

1,453,265

UNITED STATES PATENT OFFICE.

CHARLES E. BIRD, OF MINNEAPOLIS, MINNESOTA.

TRACTOR.

Application filed May 22, 1920. Serial No. 383,379.

*To all whom it may concern:*

Be it known that I, CHARLES E. BIRD, a citizen of the United States, residing at Minneapolis, in the county of Hennepin and State of Minnesota, have invented certain new and useful Improvements in Tractors; and I do hereby declare the following to be a full, clear, and exact description of the invention, such as will enable others skilled in the art to which it appertains to make and use the same.

My invention has for its object to provide a simple and highly efficient tractor capable of general use for agricultural and similar purposes, and to such ends, generally stated, the invention consists of the novel devices and combination of devices hereinafter described and defined in the claims.

This improved tractor involves what is believed to be a broadly new relative arrangement of traction wheels and driving connections therefor. In the preferred or complete embodiment of my invention, I provide four traction wheels, two of the wheels being laterally spaced in axial alignment, and the other two wheels being located transversely intermediate of the laterally spaced wheels for travel in the same path, one ahead and one at the rear of the projected axes of the first noted wheels. The framework is articulated so that the intermediate front and rear wheels can rise and fall in respect to the laterally spaced side wheels, and the driving force and a part of the weight of the load are carried to the said front and rear wheels through equalizing springs.

The motor or engine on the tractor drives the laterally spaced traction wheels through independently operative clutch mechanism, and these independent clutch mechanisms also drive the sections of a divided jack shaft. The sections of the divided jack shaft are connected through a differential gear mechanism, the master element of which is utilized as an element to transmit the driving movements to the front and rear wheels in such manner that, when running straight ahead, all four wheels may be driven at the same speed, but when one of the side traction wheels is idle or stationary and the other side traction wheel is driven, as in making an abrupt turn on the first noted side wheel of the pivot, the two front and rear wheels will be driven at one-half the speed of the outside, or active side wheel. This, of course, is an action desired, because of the fact that the front and rear wheels travel on a line midway between the outside wheels. All four wheels above noted are, preferably, positively driven.

The tractor above described in a general way is illustrated in the accompanying drawings wherein like characters indicate like parts throughout the several views.

Referring to the drawings:

Fig. 1 is a plan view thereof with some parts in horizontal section;

Fig. 2 is a side elevation of the tractor with some parts sectioned on the line 2—2 of Fig. 1 and with some parts broken away;

Fig 2$^a$ is a detail in section on the line 2$^a$—2$^a$ of Fig 1; and

Fig. 2$^b$ is a detail of the clutch shaft elements.

In this preferred arrangement of the tractor, there is a transversely elongated rectangular main frame 3 having, at its sides, bearings 4 through which is extended a floating axle 5. A long driving sleeve 6 is journaled on the axle 5 and extends from the one bearing 4 to the other bearing 4; and this sleeve is journaled in suitable intermediate bearings 7 on the main frame 3.

The laterally spaced or outside traction wheels 8 are loosely journaled on the ends of the axle 5 and are provided with internal gears 9 that mesh with pinions 10 on the outer ends of the sections of a divided jack shaft 11 that is journaled in suitable bearings on the main frame 3. The sections of the jack shaft 11, at their adjacent edges, are connected by a differential gear mechanism involving a gear housing 12, beveled gears 13 and beveled pinions 14. The housing 12 constitutes the master element of the differential gear mechanism, is loosely journaled on the ends of the sections of the jack shaft 11 and is provided with an extended hub 15 that carries two sprocket wheels 16 and 17 for an important purpose which will presently appear. The beveled gears 13 are secured, one to each section of the jack shaft 11 and the pinions 14 are journaled to the housing 12 and mesh with the two beveled gears 13.

The numeral 18 indicates a front supplemental frame, and the numeral 19 indicates a rear supplemental frame, both of which are pivotally connected to the main frame, so that an articulated framework is produced. The supplemental framework 18 has a plurality of rearwardly extended arms 20 provided with removable half-bearings 21 (see Figs 1 and 2ª) that are pivoted on hubs of the main frame, so that said supplemental frame 18 may be readily detached from the main frame.

The rear supplemental frame 19 has a plurality of forwardly extended arms 22 which, by nut-equipped bolts 23, are pivotally and detachably connected to the main frame so that said supplemental frame 19 may also be readily detachable from the main frame.

The supplemental frames 18 and 19 are provided with large rectangular openings, in the former of which, the front traction wheel 24 and in the latter of which the rear traction wheel 25 is located. These traction wheels 24 and 25 are journaled, respectively, on short axles 26 and 27 secured to the supplemental frames 18 and 19. On the hub of the front traction wheel 24 is a sprocket wheel 28, and on the hub of the rear traction wheel 25 is a similar sprocket wheel 29. A sprocket chain 30 runs over the sprocket 28 and over the aligned sprocket 16, and the sprocket chain 31 runs over the sprocket 29 and over the aligned sprocket 17. Here it will be remembered that the sprockets 16 and 17 are carried by the so-called master driving element of the differential gear mechanism.

The numeral 32 indicates a motor, preferably, a multi-cylinder internal combustion engine rigidly mounted on the supporting bracket 33 that is rigidly secured to the main frame 3. The crank shaft of this engine carries a spur pinion 34 shown by dotted lines in Fig. 2, but which runs in mesh with a spur gear 35 rigidly secured on the driving sleeve 6. Here it may be noted that the driving sleeve 6 constitutes a tubular driving axle.

On the opposite end portions of the driving sleeve or axle 6 are clutch cones 36 that are keyed to slide on but rotate with said sleeve. These clutch cones 36 co-operate with internal clutch cones 37 that are loosely journaled on the driving sleeve 6 and are rigidly secured to rotate with spur pinions 38 that mesh with spur gears 39, the latter being rigidly secured, one to each section of the divided jack shaft 11. The numeral 40 indicates brake bands that work independently on the exterior cylindrical surfaces of the clutch members 37 and may be operated in any well known manner.

The hubs of the two slidable clutch cones 36 are grooved and these grooves are provided with loose shipper rings 41 that have diametrically projecting pins 42 (see Figs. 1 and 2ᵇ).

The numeral 43 indicates a transversely movable clutch shifting rod having forwardly projecting prongs terminating in bifurcated heads 44 that engage the pins 42 of the collars 41.

The numeral 45 indicates a steering post mounted in suitable bearings on the main frame 3 and provided at its upper end with a steering lever 46. Near its lower end, the steering post 45 has a short arm 47 that is pivotally connected to the intermediate portion of the rod 43.

The numeral 48 indicates laterally spaced equalizing springs of the semi-eliptical type, the same, at their central portions, being rigidly anchored to the sides of the main frame 3 by clamps 49. The front ends of these springs 48 are connected by links 50 to lugs 51 on the front supplemental frame 18, and the rear ends of said springs are connected by links 52 to lugs 53 on the rear supplemental frame 19.

The numeral 54 indicates a shield which covers the rear wheel 25, the same being shown in Fig. 2, but removed from Fig. 1. The numeral 55 indicates the driver's seat shown as supported from the bracket 33. The clutch cones 36 are normally pressed into contact with the co-operating clutch member 37 by coiled springs 56 that react against collars 57 on the driving sleeve 6.

The operation of this tractor in a general way has been discussed in the introduction to the description. The following statements are pertinent.

When the steering lever 46 is in its central or intermediate position, both clutches will be in action, both sections of the jack shaft 11 will be driven at the same speed and all four of the traction wheels will be driven at the same speed so that the tractor will then travel straight ahead.

When it is desired to cause the machine to turn toward the right or to the left, one or the other of the clutches will be thrown out of action so as to stop the driving action of the outside traction wheel that is on that side toward which the turn is to be made. For instance, if it is desired to turn toward the left, the steering lever 46 will be moved toward the right, thereby throwing the left hand clutch out of action, while leaving the right hand clutch in action. This stops the driving movement of the left hand outside traction wheel 8 which will then act as a pivot on which the tractor will approximately turn; and the right hand outside traction wheel 8 will then be driven at full speed and the main or master driving element 12 of the differential clutch mechanism will be then driven at half speed so that the front and rear traction wheels will then also be driven at half speed, which is the proper driving speed thereof in making such a turn.

In actual practice I have found that the tractor can be turned, as just described, and can be steered in any and all directions with the greatest facility and ease. From the above it will be seen that the differential gear mechanism in this tractor is used in a very different manner from that in which it is ordinarily used, in that in this arrangement, the two sections of the jack shaft are independently clutch driven, and the master member of the differential mechanism, instead of transmitting motion positively to the laterally spaced traction wheels, is used to transmit the proper proportionate speed, up to full speed, to the front and rear intermediate traction wheels.

In practice, I have found that this tractor may be run over the roughest kind of road or ground surfaces, through ditches and over embankments, and the like, and that it has all of the advantages of a tractor of the traction belt type but is free from the undesirable features of the latter.

When the tractor is driven forward, and especially when pulling a heavy load, such as a gang plow, or the like, the driving force will tend to raise the front wheel 24. This lifting force is transmitted through the springs 48 to the rear traction wheel 25, but all of the four traction wheels will be kept upon the ground, regardless of irregularities. The springs 48, of course, also compensate for irregularities in the ground and resulting vertical movements of the traction wheels, the one in respect to the other. Moreover, the said springs keep the main frame 3 properly positioned. Inasmuch as greater ground-engaging pressure is produced on the rear traction wheel 25 than on the front traction wheel 24, the latter may be made smaller than the former, but the driving connections must be such that both of the said traction wheels will be driven at the same peripheral speed.

For light work it may be sometimes desirable to remove the front traction wheel 24, its supplemental frame 18 and its driving connection from the tractor, and this, as is obvious, may be quickly accomplished, and when desired, the said parts may be again coupled to the tractor. Even when this front traction wheel is removed, the differential gear mechanism will operate, as already described, to drive the rear traction wheel at the proper proportionate speed.

What I claim is:

1. A tractor having laterally spaced side traction wheels and longitudinally offset transversely intermediate traction wheels, a motor on said tractor having connections for driving all of said traction wheels, and including a differential gear mechanism in the driving connection between said intermediate and side wheels operative to drive said intermediate wheel at a proportionate speed in turning.

2. A tractor having laterally spaced side traction wheels and longitudinally offset transversely intermediate traction wheels, a motor on said tractor having connections for driving all of said traction wheels, said driving connections including a divided jack shaft, a differential gear mechanism connecting the sections of said divided jack shaft, a motor driven clutches and co-operating connections for simultaneously or independently driving the sections of said jack shaft, the sections of said jack shaft having independent driving connections to said laterally spaced side traction wheels, and a driving connection for said intermediate traction wheels driven from the master driving element of said differential clutch mechanism.

3. A tractor having laterally spaced side traction wheels and front and rear intermediate traction wheels, in combination with a motor on said tractor having connections for driving all of said four traction wheels, said tractor having a vertically movable supplemental frame permitting independent vertical movements of said front and rear traction wheels in respect to said side traction wheels.

4. A tractor having laterally spaced side traction wheels and front and rear intermediate traction wheels, in combination with a motor on said tractor having connections for driving all of said four traction wheels, said tractor having a main frame with a detachable supplemental section which, when removed, disconnects one of said intermediate traction wheels from the tractor.

5. A tractor having laterally spaced side traction wheels and front and rear intermediate traction wheels, in combination with a motor on said tractor having connections for driving all of said four traction wheels, said driving connections including a divided jack shaft, the sections of which are independently geared to said side traction wheels, motor driven clutches and co-operating gears operative to simultaneously or independently drive the sections of said jack shaft, a differential gear mechanism connecting the sections of said jack shaft, and power transmitting connections operative to drive said front and rear traction wheels from the master element of said differential clutch mechanism.

6. A tractor having laterally spaced side traction wheels and front and rear intermediate traction wheels, in combination with a motor on said tractor having connections for driving all of said four traction wheels, said driving connections including a divided jack shaft, the sections of which are independently geared to said side traction wheels, motor driven clutches and co-operating gears operative to simultaneously or independently drive the sections of said jack shaft, a differential gear mechanism connecting the sections of said jack shaft, and power transmitting connections operative to drive said front and rear traction wheels from the master element of said differential clutch mechanism, said tractor having a main frame with a supplemental section pivoted for vertical movements to thereby permit independent vertical movements of said front and rear traction wheels in respect to said side traction wheels.

7. A tractor having laterally spaced side traction wheels and front and rear intermediate traction wheels, in combination with a motor on said tractor having connections for driving all of said four traction wheels, said driving connections including a divided jack shaft, the sections of which are independently geared to said side traction wheels, motor driven clutches and co-operating gears operative to simultaneously or independently drive the sections of said jack shaft, a differential gear mechanism connecting the sections of said jack shaft, and power transmitting connections operative to drive said front and rear traction wheels from the master element of said differential clutch mechanism, and a steering device with connections adapted to throw either of said clutches out of action, at will, or to permit both of said clutches to simultaneously co-act to drive the tractor.

8. A tractor having laterally spaced side traction wheels and front and rear intermediate traction wheels, in combination with a motor on said tractor having connections for driving all of said four traction wheels, said driving connections including a divided jack shaft, the sections of which are independently geared to said side traction wheels, motor driven clutches and co-operating gears operative to simultaneously or independently drive the sections of said jack shaft, a differential gear mechanism connecting the sections of said jack shaft, and power transmitting connections operative to drive said front and rear traction wheels from the master element of said differential clutch mechanism, said tractor having a main frame with a supplemental section pivoted for vertical movements to thereby permit independent vertical movements of said front and rear traction wheels in respect to said side traction wheels, and a steering device with connections adapted to throw either of said clutches out of action, at will, or to permit both of said clutches to simultaneously co-act to drive the tractor.

9. A tractor having laterally spaced side traction wheels and front and rear intermediate traction wheels, in combination with a motor on said tractor having connections for driving all of said four traction wheels, said tractor having a main frame and front and rear supplemental frames pivoted thereto for vertical movements, to thereby permit said front and rear traction wheels to move vertically in respect to said side traction wheels.

10. A tractor having laterally spaced side traction wheels and front and rear intermediate traction wheels, in combination with a motor on said tractor having connections for driving all of said four traction wheels, said tractor having a main frame and front and rear supplemental frames pivoted thereto for vertical movements, to thereby permit said front and rear traction wheels to move vertically in respect to said side traction wheels, and lever acting springs intermediately secured to said main frame and connected at their front and rear ends, respectively, to said front and rear supplemental frame sections.

11. A tractor having laterally spaced side traction wheels and front and rear intermediate traction wheels, in combination with a motor on said tractor having connections for driving all of said four traction wheels, said front and rear traction wheels being capable of vertical movements in respect to said side traction wheels, and an equalizing spring yieldingly pressing said front and rear traction wheels downward.

12. A tractor having laterally spaced side traction wheels and front and rear intermediate traction wheels, in combination with a motor on said tractor having connections for driving all of said four traction wheels, the said tractor having a main frame and vertically movable front and rear supplemental frames to which said front and rear wheels, respectively, are journaled, and a lever-acting spring anchored to said main frame and connected to said front and rear supplemental frames and yieldingly pressing both thereof downward.

13. A tractor having laterally spaced side traction wheels and longitudinally offset front and rear intermediate traction wheels, a motor on said tractor having connections for driving all of said traction wheels, and means for discontinuing the driving of either of said side wheels at will and driving said intermediate wheels at reduced speed.

14. A tractor having a frame, a single pair of spaced traction wheels at the sides thereof alined on an axis extending transversely of the frame, and a traction wheel located centrally of the frame at both the front and rear ends thereof on axes parallel to said axis, and means on said frame for driving all of said wheels.

In testimony whereof I affix my signature.

CHARLES E. BIRD.